(No Model.)

T. WAGNER & W. HABERMANN.
WAGON BODY.

No. 517,500. Patented Apr. 3, 1894.

Witnesses.
C. H. Keeney
Anna O. Faust

Inventors.
Theodore Wagner &
Wilhelm Habermann.
By Benedict & Morsell
Attorneys.

THE NATIONAL LITHOGRAPHING COMPANY,
WASHINGTON, D. C.

UNITED STATES PATENT OFFICE.

THEODORE WAGNER AND WILHELM HABERMANN, OF MILWAUKEE, WISCONSIN.

WAGON-BODY.

SPECIFICATION forming part of Letters Patent No. 517,500, dated April 3, 1894.

Application filed November 17, 1893. Serial No. 941,206. (No model.)

*To all whom it may concern:*

Be it known that we, THEODORE WAGNER and WILHELM HABERMANN, of Milwaukee, in the county of Milwaukee and State of Wisconsin, have invented a new and useful Improvement in Wagon-Bodies, of which the following is a description, reference being had to the accompanying drawings, which are a part of this specification.

Our invention has relation to improvements in wagon bodies, the device having particular reference to means or mechanism for governing the discharge opening or openings through which the body is relieved of its load.

In the ordinary form of wagon bodies used for containing grain, coal, and the like, the mechanism governing the discharge opening or openings is usually of such a character as to be capable of operation only after considerable difficulty, and with danger of breakage of or damage to the working parts.

It is the object of our invention to provide a simple mechanism of the character referred to, which overcomes the objections above indicated, and, therefore, admits of operation with facility and ease, and without danger of damage to the parts.

With the above objects in view, the invention consists of the devices and parts as hereinafter described and claimed, or their equivalents.

Figure 1:
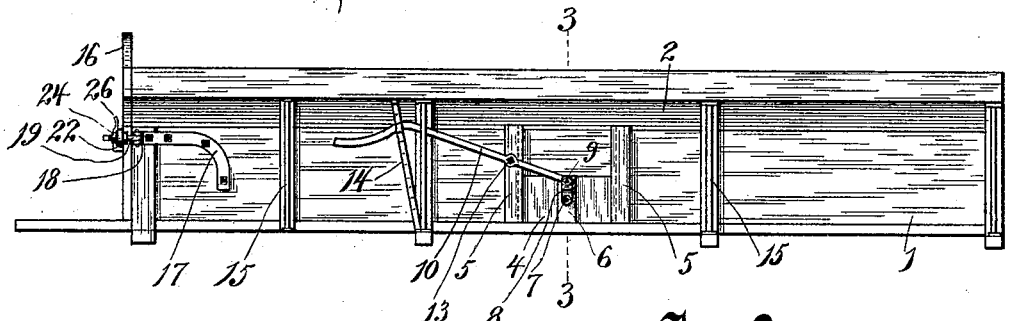
Figure 2:
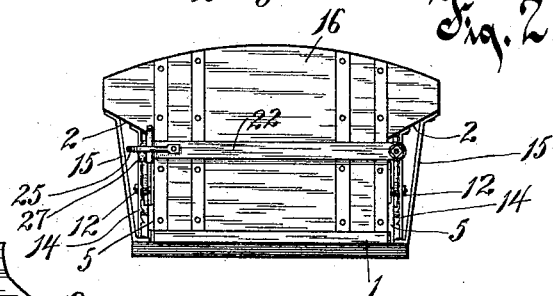
Figure 3:
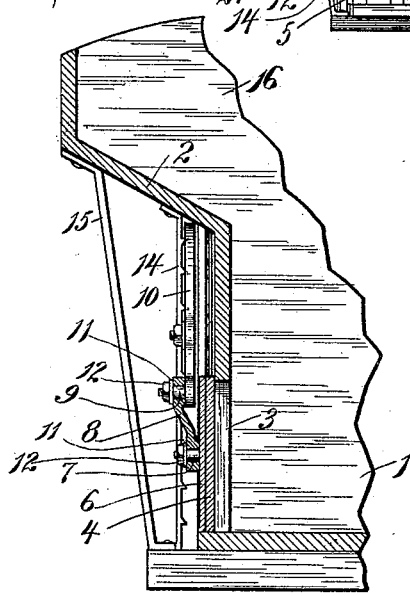
Figure 4:
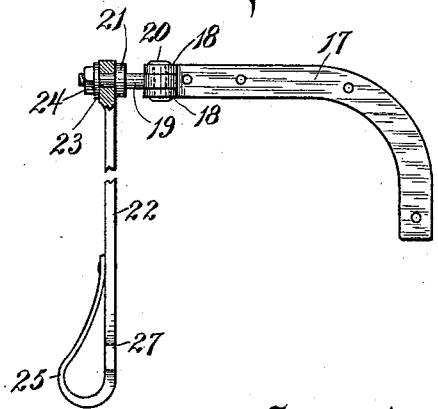

Referring to the drawings, Figure 1, is a side elevation of a wagon body embodying our improvements. Fig. 2, is a view of the tail end of the wagon body. Fig. 3, is a transverse section, on an enlarged scale, on the line 3—3 of a fragment of Fig. 1, and Fig. 4, is a detail of the side strap, and the tail board retaining bar, the latter being shown as turned down, and in section at the point of its hinge connection with the side strap.

Like numerals of reference indicate like parts throughout the several views.

Referring to the drawings the numeral 1 indicates a wagon body, having its upper portion enlarged or flared, to form medial inclined shoulders 2. This particular form of wagon body is not essential to our invention, but is only illustrated as one of the preferred forms in connection with which our invention is employed.

The lower portion of the side of the wagon body is shown as provided with an opening 3, preferably of rectangular form, which is normally closed by means of a door 4, working in a suitable guide way formed by strips 5, 5, secured to the sides of the wagon body. A vertical bar 6 is secured centrally to the door, and this bar has projecting therefrom medially a bolt 7, preferably integral therewith. This bolt receives the eye of an arm 8, which arm is bent or curved outward, and at its upper end is provided with a second eye which receives a bolt 9, preferably formed as an integral part of an operating lever 10. Both the bolts 7 and 9 receive upon their outer ends washers 11, 11, which bear against the side of the arm 8 at opposite ends. Nuts 12, 12 turn upon the threaded ends of the bolts 7 and 9 and bear against the washers above referred to. The operating lever 10 is pivoted medially on a pin 13, preferably extending from one of the strips 5. The free end of the operating lever is preferably curved downward to admit of convenient manipulation.

The numeral 14 indicates an obliquely arranged rack, the teeth of which project inward from the inner side thereof. The upper one of these teeth points upward, while the remaining teeth of the series point downward.

When the door 4 is closed, as shown in the drawings the operating end of the lever is supported on the upper tooth of the series. When it is desired to operate the lever, in order to raise the door, the free end of said lever is pushed inward slightly in order to release the same from contact with the upper tooth of the rack bar. The lever can then be readily depressed as the same will ride past the other teeth of the rack, which as above stated point downward. With the depression of the operating end of the lever, the opposite end thereof is raised, which of course has the effect of elevating the door. When the proper elevation of the door is attained, the free end of the lever may be made to engage the proper downward pointing tooth of the rack, so as to maintain said door in its elevated position so long as it is desired to continue the unloading of the wagon through the side aperture. When it is desired to close said side aperture, all that is necessary to be done is to disengage the free end of the lever from the tooth, and then press said free end inward so as to be out of line with the downward pointing teeth on the return upward movement of the lever. When it reaches the limit of its upward movement it is made to again engage the upper tooth of the rack.

While we have described only one side of the wagon body as provided with a side discharge opening or aperture, yet, in practice, it will perhaps be found advisable and preferable to construct both sides of the body with these openings, and with the peculiar mechanism described for controlling said openings. In Fig. 2 of the drawings such openings and mechanism are, therefore, shown on opposite sides of the body.

The numerals 15 indicate side braces or supports, which, while forming no part of our invention, are desirable in wagon bodies constructed in accordance with the accompanying illustration.

The tail end of the wagon body is closed by an ordinary form of tail board 16. At the rear end of one of the sides of the body is secured a strap 17, preferably of curved form, said strap terminating at one end in eyed lugs 18, 18, between which is received the eye of a bolt 19. The eye of this bolt, and the eyes of the lugs register, and receive a vertical pin 20, forming a hinge connection. The bolt 19 is formed medially with an annular enlargement or shoulder 21, against which bears the end of a retaining bar 22, said end of the bar provided with an eye or aperture through which the bolt 19 passes. The bolt 19 also carries a washer 23 which bears against the outer side of the retaining bar, and next to this washer is a nut 24, turning upon the threaded end of the bolt. The retaining bar is adapted to turn upon the bolt 19, so as to be thrown up to the position shown in Fig. 2, or swung down to the position illustrated in Fig. 4. The opposite end of the retaining bar is formed into a loop 25, which forms a convenient handle for operating said bar. Secured to the side of the wagon body, and projecting beyond the tail end of the wagon in position to be engaged by the end of the retaining bar, is a catch 26, preferably of spring material, and provided with an upward-extending tongue, which is curved inward slightly to prevent the free end of the retaining bar from working up out of engagement therewith. The retaining bar is also provided with a depending lug 27, which more effectually retains said bar in engagement with the catch.

In Fig. 2 we have shown the retaining bar in locked position to hold the tail board in place. When it is desired to remove the tail board, all that is necessary to be done is to lift the free end of the retaining bar by the loop or handle portion 25, and owing to the spring or yielding character of the catch, the bar is released from engagement therewith. In the uplifting of the bar, the opposite end thereof turns on the bolt 19. After the bar is disengaged from the catch, it may be allowed to swing down to the position shown in Fig. 4, and then swung around horizontally on the pivot pin 20, so as to be out of the way.

From the above description, it is thought that the operation, construction and advantages of our invention will be readily understood without requiring further explanation. It will be seen that it is exceedingly simple in construction, inexpensive of production, and can be applied to almost any form of wagon body with very little change being necessary in the construction of said body, and with but a minimum of trouble or labor.

Having thus described our invention, what we claim, and desire to secure by Letters Patent, is—

1. In a wagon body, the combination, of a tail-board, an arm secured to the wagon body, a bolt pivoted horizontally to said arm, a retaining bar turning vertically upon the bolt, and a catch with which the free end of the retaining bar is adapted to engage, substantially as set forth.

2. In a wagon body, the combination, of a tail-board, an arm secured to the wagon body, a bolt pivoted horizontally to said arm, a retaining bar turning vertically upon the bolt, and provided at its free end with a depending lug, and a spring catch provided with an upward-projecting inward-curved extension, substantially as set forth.

3. In a wagon body, the combination, of a tail-board, an arm secured to the wagon body, a bolt pivoted horizontally to said arm, a retaining bar turning vertically upon the bolt, said bar having its free end turned over and secured at its extremity to the main portion of the bar, to form a loop or handle, and a catch with which the free end of the retaining bar is adapted to engage, substantially as set forth.

4. In a wagon body, the combination, of a tail-board, an arm secured to the wagon body, and provided at its rear end with eyed lugs, a bolt provided with an eye passing between and registering with the eyed lugs of the arm, a vertical pivot pin passing through the registering eyes, a retaining bar turning upon the bolt, and a catch with which the free end of the retaining bar is adapted to engage, substantially as set forth.

In testimony whereof we affix our signatures in presence of two witnesses.

THEODORE WAGNER.
WILHELM HABERMANN.

Witnesses:
ARTHUR L. MORSELL,
ANNA V. FAUST.